United States Patent Office 2,845,424
Patented July 29, 1958

2,845,424
PREPARATION OF MELAMINE

Franz Kaess and Erwin Rothlauf, Trostberg, Germany, assignors to Süddeutsche Kalkstickstoff-Werke A. G., Trostberg, Germany No Drawing. Application October 17, 1955
Serial No. 541,087

2 Claims. (Cl. 260—249.7)

The invention relates to the preparation of melamine.

It is known to prepare melamine by the heat polymerization of cyanamid or dicyanodiamide. Methods are also known to prepare melamine by heating urea in a closed reaction vessel at temperatures of 270 to 600° C. Instead of urea, also ammonium cyanate, biuret, cyanourea, ammelide, ammeline, and dicyanodiamidine may be used.

It is a principal object of the invention to shorten the reaction time and to improve the yields in the preparation of melamine from urea.

Other objects and advantages will be apparent from a consideration of the specification and claims.

The recited objects are accomplished according to the invention by employing starting mixtures consisting of urea and 2.5 to 20 percent by weight of guanidine, calculated on the urea. The property of guanidine to form melamine on heating, has been known, but there was no indication that additions of guanidine to urea could improve the conversion of said urea to melamine.

The reaction may be carried out by a short heating of urea with guanidine in an autoclave. After a temperature of 400–450° C. has been reached, the reaction is mostly terminated within a period of 15 min.

The yields reach 94 percent, calculated on the equations:

$$6(NH_2)_2CO = (NH_2CN)_3 + 6NH_3 + 3CO_2$$

$$3(NH_2)_2CNH = (NH_2CN)_3 + 3NH_3$$

Said equations represent the general total reactions but do not explain the exact course of the reactions involved.

It was found that in the course of the reaction biuret is formed as an intermediate reaction product. The surprising effect of the addition of guanidine may, therefore, be explained by assuming that the ring closure to melamine is facilitated by the coaction of said biuret according to the reaction

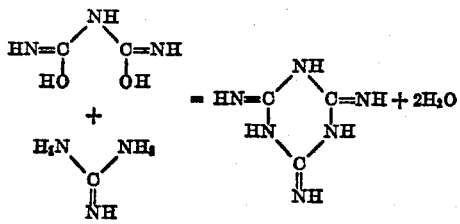

According to this assumption, a second molecule of biuret would be converted in the further course of the reaction by water into carbonic acid and ammonia according to the reaction.

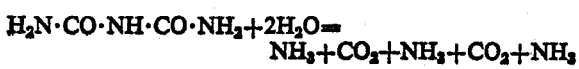

It is of course to be understood that this tentative explanation for the favorable effect of an addition of guanidine to urea is not intended to limit the scope of the invention in any way but that said scope is defined by the appended claims.

The following examples are given to illustrate the method of the invention.

Example 1

180 g. (3 moles) of urea are intimately mixed with 20 g. (.34 mole) of guanidine and placed into an autoclave of 1 ltr. capacity. The autoclave is heated within 60 min. to 400° C. The pressure rises hereby first slowly to 60–100 atm. and then suddenly to above 200 atm. after a temperature of 400° C. has been reached. At 400° C., the reaction is completed after 15 min. and the autoclave is quickly cooled.

The obtained reaction product is light gray. The yield of melamine is 94.1 percent, calculated on urea and disregarding the converted guanidine.

If the reaction was carried out under exactly the same conditions but with 200 g. of urea without addition of guanidine, the yield of melamine was only 80 percent.

Example 2

190 g. (3.2 moles) of urea and 15 g. (0.08 mole) of guanidine carbonate were intimately mixed and placed into an autoclave of 1 ltr. volume. After forcing 20 g. of ammonia into the autoclave, it was heated within 60 min. to 400° C. and maintained at said temperature for 15 min. The autoclave was quickly cooled, and then the reaction product was withdrawn.

The yield of melamine, calculated as in Example 1, was 91 percent.

If the same reaction was carried out under the same conditions with 200 g. of urea without guanidine carbonate, the yield of melamine was only 69 percent.

What we claim is:

1. A method of preparing melamine from urea comprising mixing urea with 2.5 to 20 percent by weight, calculated on said urea, of a member of the group consisting of guanidine and guanidine carbonate, and heating said mixture in a closed system at a temperature of about 400 to 450° C. until the gas development has substantially terminated.

2. The method of claim 1, wherein said mixture is heated in the presence of ammonia.

References Cited in the file of this patent

UNITED STATES PATENTS

| 2,550,659 | Vingee | Apr. 24, 1951 |
| 2,649,446 | Vingee | Aug. 18, 1953 |
| 2,684,964 | Heckel | July 27, 1954 |

FOREIGN PATENTS

| 598,175 | Great Britain | Feb. 12, 1948 |

OTHER REFERENCES

Blair: Jour. of the Amer. Chem. Soc., vol. 48, pages 87–95 (1926).

Smith's Inorganic Chemistry (2nd ed.), pages 566–567 (1937).

Smolka: Monat: für Chemie, 1889, pages 90–94.

Ser. No. 245,566, vol. 671, page 1501, O. G., June 30, 1953.